United States Patent
Vicik

[45] June 6, 1972

[11] 3,667,360

[54] OPTICAL SCANNING SYSTEM

[72] Inventor: Frederick Vicik, Tuckahoe, N.Y.

[73] Assignee: Columbia Broadcasting System, Inc., New York, N.Y.

[22] Filed: Apr. 23, 1969

[21] Appl. No.: 818,769

[52] U.S. Cl. ...................................................95/12.5, 95/15
[51] Int. Cl. ......................................................G03b 37/02
[58] Field of Search...............................95/12.5, 15; 178/6.7

[56] References Cited

UNITED STATES PATENTS 3,019,292    1/1962    John .........................................178/6.7

*Primary Examiner*—John M. Horan
*Attorney*—Brumbaugh, Graves, Donohue & Raymond

[57] ABSTRACT

A real image of a point source of radiation is formed in space by a light beam modulated to convey information and reflected from a rotating prism. The rotation of the prism causes the image to move along a limacon curve. The moving image is reflected by a Mangin mirror and a second real image is formed on a photographic film strip. The second image remains in focus as it traverses a straight line on the film strip with a speed directly proportional to the tangent of the angle formed by the scanning beam by which the second image is formed with a line normal to the straight line traversed by the second image.

6 Claims, 4 Drawing Figures

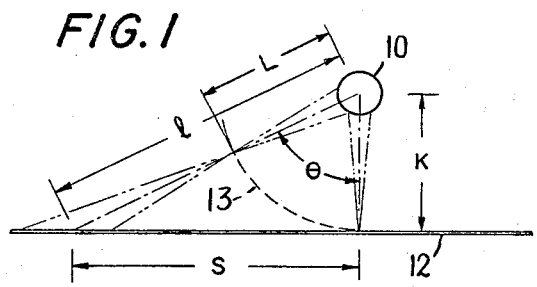
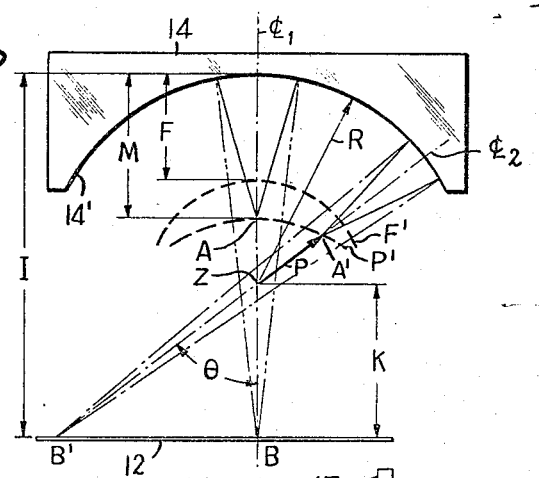
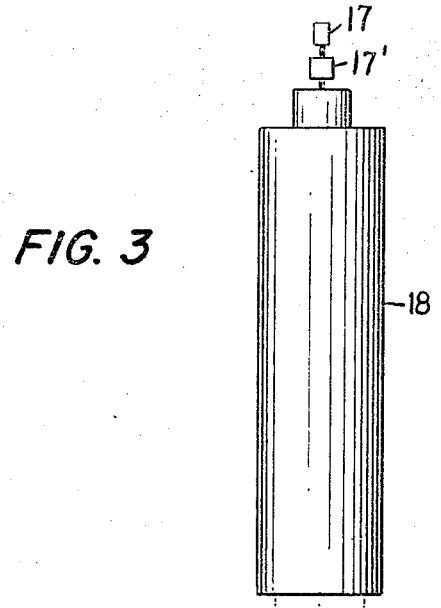
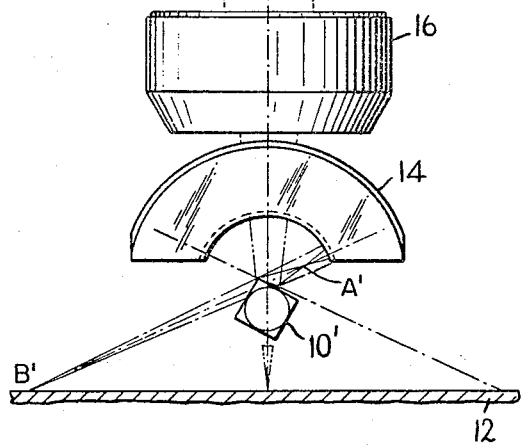
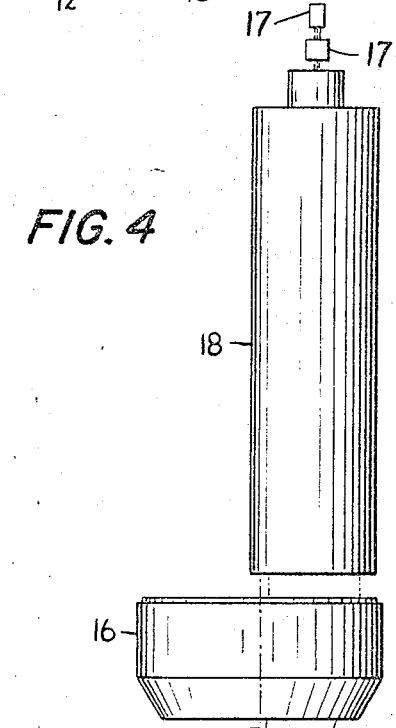
FIG. 1
FIG. 2
FIG. 3
FIG. 4
INVENTOR.
FREDERICK VICIK

3,667,360

OPTICAL SCANNING SYSTEM

BACKGROUND OF THE INVENTION

This invention relates to optical scanning and, more particularly, to novel and highly effective methods and apparatus facilitating recording on photographic film with a scanning beam of modulated light that is always in focus at its point of impingement on the photographic film, the recording being made in such a manner that all portions of the picture on the developed film are seen in plan view, notwithstanding that the scanning beam scans most portions of the film obliquely.

The invention has many applications but will be described particularly as it relates to nighttime reconnaissance from low-flying aircraft. Typically, the vehicle containing the scanning apparatus is placed on a desired course at uniform altitude, and the terrain is scanned in successive strips each very short in the direction of vehicle travel and very long in a direction normal to the direction of vehicle travel. Such scanning is readily effected by conventional apparatus of a type shown, for example, in a patent to Hufnagel et al. U.S. Pat. No. 3,316,348, which includes a multifaceted reflector that rotates at high speed and reflects a laser beam from the vehicle onto the terrain. The laser beam scans the terrain in successive strips normal to the direction of flight, and the reflections from the terrain caused by the scanning are monitored and used to modulate a recording beam of light that simultaneously traverses successive transverse lines of a moving strip of photographic film carried aboard the vehicle. The movement of the vehicle and rotating reflector are coordinated with the movement of the film strip and the light beam that traverses it in order to make a photographic record of the terrain.

For good resolution, the laser beam that scans the terrain must be small in cross section, and, in view of the great speed of the vehicle, the rotating reflector must turn at high speed in order not to leave gaps between successive scanning lines. During the course of any one sweep of the beam across the terrain the angular velocity of the reflector must be substantially constant because of inertia. Thus, the translational velocity with which the beam sweeps the terrain is non-uniform, being lowest directly beneath the vehicle and increasing towards each horizon in direct proportion to the tangent of the angle formed by the laser beam with the vertical.

The scanning of the film strip may be coordinated with the scanning of the terrain by means of a rotating multifaceted reflector—either the same one used for scanning the terrain or a different one—that reflects a laser beam onto the film strip in such a manner that the film scan angle is always equal to the terrain scan angle. This provides tangent restitution that avoids a compression of the recording at the edges of the film strip (in a direction normal to the direction of movement of the film strip) that would otherwise occur because of the non-uniform translational terrain scan velocity mentioned above. Tangent restitution is desirable in order to show accurately the angles at which roads intersect, for example. However, this approach presents a serious problem.

For maximum resolution per unit of film area, the recording beam must be brought to a small sharp focus at all points of impingement on the film strip. In conventional apparatus, the recording spot (i.e., the spot where the recording beam is in focus) travels a curved path and either fiber optics or field flattening lenses are used to make the spot travel along a straight line on the film strip, which, in order to provide an analog of the scanned terrain and permit tangent restitution, must be maintained flat or nearly flat in a direction normal to the direction in which the film strip moves at the locus of the recording. Fiber optics are resolution and cosmetic limited, however, and field lenses are scan angle limited and do not produce complete tangent restitution.

Another expedient is to place the scanner so far from the film strip that the curved path of the recording spot approximates a straight line. This has obvious disadvantages where space requirements are stringent and, in view of the small angle of scan of the film, fails to achieve tangent restitution where the terrain is scanned over a large angle.

It is also possible to use a small laser beam which is not further focused. However, this places an undesirable limit on resolution in view of the excessive diffraction resulting from small-aperture optics.

Finally, any moving of optical elements to produce a zoom effect is wholly impracticable because of the rapid cam action required for an acceptable scan rate.

SUMMARY OF THE INVENTION

An object of the invention is to remedy the shortcomings of apparatus and methods noted above and, in particular, to provide a diffraction-limited recording spot that is always in focus while recording with complete tangent restitution. A further object of the invention is to accomplish the foregoing objects without the use of fiber optics or field lenses, without off-axis operation, without abrupt changes in momentum of moving parts, and without the use of bulky equipment.

The foregoing and other objects of the invention are attained, in a representative embodiment thereof, by the provision of concave spherically curved reflector means having a spherically curved equivalent focal surface. A light-sensitive film strip is mounted a distance $K$ from the center of curvature of the equivalent focal surface on the opposite side of the center from the reflector means. Scanning means is provided for directing light onto the spherically curved reflector means from a point in space. The spherically curved reflector means reflects the light as a scanning beam onto the film strip. The scanning means causes the point in space to move along a curved path $P'$ defined with respect to the center of curvature of the equivalent focal surface substantially by the equation $$P = F(X)/(X + \cos\theta),$$

where $P$ is the distance between the point in space and the center of curvature of the equivalent focal surface, $F$ is the radius of curvature of the equivalent focal surface, $X = K/F$, and $\theta$ is the scan angle formed by the scanning beam with a line normal to the line scanned on the film strip.

The point in space is readily caused to move along a limacon curve substantially conforming to the equation by including a rotating prism in the scanning means, the prism being mounted so that the reflecting surfaces thereof successively pass near the center of curvature of the equivalent focal surface.

BRIEF DESCRIPTION OF THE DRAWING

Additional aspects of the invention can be understood from a consideration of the following detailed description of a representative embodiment thereof in conjunction with the accompanying figures of the drawing, wherein:

FIG. 1 is a highly schematic side elevation of scanning apparatus illustrating the problem to which the present invention is directed;

FIG. 2 is a schematic side elevation of a representative embodiment of the present invention;

FIG. 3 is a side elevation showing in greater detail a preferred embodiment of the invention; and FIG. 4 is an end elevation of the apparatus of FIG. 3.

DESCRIPTION OF THE PREFERRED EMBODIMENT

The problem to which the present invention is directed can be understood by reference to FIG. 1, which shows a scanner 10 mounted for rotation about an axis normal to the plane of the drawing and spaced a distance $K$ above a film strip 12 upon which an image is to be recorded. As the scanner 10 rotates, it is adapted to sweep a beam of modulated light in the plane of FIG. 1 across the surface of the film strip 12 in order to expose it and record an image thereon. As the light moves from one side to the other of the film strip 12, it travels a distance $2S$ along a line at right angles to the dimension $K$. Since only one-half the scan is depicted, only the distance $S$ is shown. The symbol $l$ represents the distance from the scanner 10 to the point of impingement of the scanning beam on the film strip 12 at any scan angle $\theta$ with respect to the vertical.

Since the distance L between the scanner 10 and the point at which the scanning beam is in focus does not vary, the beam is in focus at points that trace an arcuate path 13. Accordingly, the cross section of the beam where it impinges on the film strip 12 increases in diameter in a direction from the center of the film strip towards either edge. Of course, the distance L can be increased by redesigning the optics so that the arcuate path 13 has a larger radius of curvature, or the distance K can be shortened, but these expedients result at best in only two points on the film strip 12 where the beam is in perfect focus. At all other points the beam is out of focus, either because it is converging towards a focus or diverging from a focus. This defocusing results in loss of resolution.

Similarly, the film strip 12 can be curved to follow the arcuate path 13, but this expedient fails to achieve tangent restitution, because the recording spot moves along the arcuate path 13 at constant speed, whereas, as noted above, in the scanning of the terrain the scanning spot moves across the terrain with non-uniform speed.

Similarly, placing the scanner 10 so far from the film strip 12 that the path 13 approximates a straight line fails to achieve tangent restitution, because the recording apparatus then is not a faithful analog of the terrain scanning apparatus, where scan angles may be very large. In addition, this expedient results in a very large and bulky device that is inconvenient for mounting aboard aircraft, where space and weight limitations are stringent.

The use of fiber optics having inlets along the path 13 and outlets spaced along the film strip 12 is also an incomplete solution to the problem for reasons noted above. The same is true of the use of field lenses.

In accordance with the present invention, substantially complete tangent restitution is provided by apparatus that maintains the distance L always equal to the distance $l$ (FIG. 1), so that recording is effected with a recording spot that traverses a substantially straight line always in perfect focus. This requires that the length L of the recording beam between the scanner 10 and the point where the recording beam is in focus and the path S traced by the beam during the scanning substantially observe the following relationships:

$$S = K \tan \theta \qquad (1)$$
$$L = (K)/(\cos \theta) \qquad (2)$$

These relationships are substantially satisfied in accordance with the present invention by apparatus of the type shown very schematically in FIG. 2. A spherical reflector 14 having a reflecting surface 14' is mounted in spaced relation to the film strip 12. The reflector 14 has an equivalent focal surface F' lying in front of the surface 14' and separated therefrom a distance $$F = R/2, \qquad (3)$$

where R is the radius of curvature of the surface 14'. If light from a point source is directed perpendicularly onto the surface 14' from any point on the equivalent focal surface F', it is reflected in a collimated beam whose focus is at infinity along an optical center line passing through the light source and the center Z of the curvatures of the surfaces 14' and F'. The foregoing statement neglects spherical aberation but is approximately true for small optical apertures.

Light directed from a point source to the reflector surface 14' from any point A between the equivalent focal surface F' and the center Z is reflected by the surface 14' and focused at a point B on the other side of the center Z along an optical line defined by the points A and Z. As the location of the light source moves closer to the center Z, the image also moves closer to the center Z, until the two coincide at the center Z. If the light source is moved beyond the center Z towards infinity, the light is reflected by the surface 14' and refocused at a point between the center Z and the equivalent focal surface F'.

The light source and image points are called conjugates and follow the lens relationship $$1/F = 1/M + 1/l, \qquad (4)$$

where F equals the radial distance between the surfaces 14' and F', M is the radial distance (along the same radius) between the surface 14' and the point A, and $l$ is the distance (along the same line) between the surface 14' and the point B of focus.

If the point A is caused to travel along certain curved path P' located between the center Z and the equivalent focal surface F', the point B can be made to trace out a straight line. This is so because a spherical reflector has no preferred optical center line and the distances F, M and $l$ are measured along the particular center line involved. In FIG. 2, two typical center lines through points A, Z, B and A', Z, B', respectively, show how the straight line on the film strip 12 is traced. It is to be noted that the less the separation between the surfaces F' and P' is along any given line passing through the center Z the more remote from the center Z becomes the point at which the light source on the surface P' is imaged.

As noted above, the path P' must be of a certain shape in order that the light always focus along a straight line on the film strip 12. The path P' is exactly defined with respect to the center Z of the surfaces 14' and F' by the relationship $$P = F(X/X + \cos \theta), \qquad (5)$$

where P is the distance along a given optical center line from the center Z of the surface 14' to a selected point, such as A', F is the focal length of the reflector 14 (or the radius of curvature of the equivalent focal surface F'), $\theta$ is the scan angle (i.e., the angle between the normal to the line traced out by the recording beam on the film strip 12 and the recording beam, as shown in FIG. 2), and X equals K/F, where K is the perpendicular distance from the center Z of the surface 14' (and of the equivalent focal surface F') to the straight line defined by the points B, B'. Since K and F are constant for any given system, the only variable in the right-hand side of Equation (5) is the scan angle $\theta$.

Equations (1) and (2) are substantially satisfied by apparatus according to the invention by mounting a rotating prism 10' (FIGS. 3 and 4) in such a position that the reflecting surfaces thereof successively pass near the center Z (FIG. 2) of curvature of the equivalent focal surface F'. In this way, the light reflected by the prism 10' is caused to form a first real image in space that traverses a limacon curve substantially conforming to Equation (5) and is then directed to the reflecting surface 14', which reimages the first real image as a second real image that simultaneously traverses a substantially straight line on the film.

It is to be understood, of course, that the path P' can be located beyond the center Z, towards infinity, and that the film 12 is then located between the equivalent focal surface F' and the center Z of the reflecting surface 14'. It does not matter theoretically, but the preferred embodiment is the type described above.

FIGS. 3 and 4 show in greater detail the apparatus of the invention. A light source, for example, a laser indicated schematically at 17, provides a beam of coherent light that is directed downwardly through a modulator shown schematically at 17', and a beam expander 18 that collimates the light into a beam of parallel coherent rays. The rays are directed to a suitable focusing lens system 16 mounted below the beam expander 18. A spherical reflector 14 is mounted below the lens system 16 and is offset with respect thereto so as not to interfere with the light source as it is directed to the scanning prism 10'.

The reflector 14 in the practical embodiment is preferably a Mangin mirror, which is a negative meniscus lens having one surface silvered to act as a spherical mirror. The other surface is shaped to compensate for the spherical aberration mentioned previously, thus permitting the use of larger optical apertures. The prism 10' is rotated rapidly about an axis normal to the plane of FIG. 3 and reflects light upwardly onto the spherical reflector, which then directs it downwardly to the film strip 12. The film strip 12 is advanced by motive means M in the direction indicated by an arrow 12' so that successive lines traced on the film 12 are properly juxtaposed.

As noted above, the prism must be so arranged as to form in space a first real image, and the real image must traverse a predetermined curved path as the prism rotates in order for the light to be refocused along a straight line at the film strip 12. The predetermined path along which the first image in space is formed lies between the equivalent focal surface of the Mangin mirror 14 and the center of curvature thereof. Thus, FIG. 3 shows, the light reflected from the prism 10' focuses at a point A' (for the particular orientation of the prism 10' shown), corresponding to the point A' shown in FIG. 2. The point B' in FIG. 3 is the film focus point and corresponds to the point B' shown in FIG. 2.

To the extent that the reflecting surfaces of the prism 10' are displaced from the center of curvature of the equivalent focal surface of the Mangin mirror, a curved line is traced by the second image (the image on the film strip 12). The prism 10' is therefore mounted so that its reflecting surfaces successively pass very close to the center of curvature of the equivalent focal surface of the Mangin mirror. This is accomplished by mounting the center of the prism 10' the requisite distance below the center of curvature of the equivalent focal surface. The image formed by the rotating prism 10' thus traces a limacon curve that substantially satisfies relation (5) above.

The residual errors are very small and complete compensation therefor can be made by a very slightly curved bridge for the film. This is unobjectionable, because it has negligible effect on tangent restitution. It offers the advantage of providing a diffraction-limited spot size throughout the scan.

Thus, there is provided in accordance with the invention novel and highly effective methods and apparatus facilitating the production of high-resolution photographic recordings made at large scan angles with complete tangent restitution. The apparatus is extremely compact and has no moving parts other than the rotating prism. Many modifications of the representative embodiment of the invention disclosed herein will readily occur to those skilled in the art. For example, the apparatus can be used for read out of a developed film where an unmodulated light beam is employed to scan the film and photomultiplier means is employed to generate an electrical signal that is a function of the intensity of the light instantaneously transmitted by the film. Further, a pyramid spinner can be substituted for the prism 10', and the resulting off-axis condition can be compensated to a large extent by a negative field lens. Moreover, the curvature of the concave reflector means may deviate from a spherical form in order, for example, to permit the use of a film bridge that is perfectly flat along the line of the recording, the recording beam being maintained in focus at all points along the line. Accordingly, the invention is to be construed as including all of the embodiments thereof within the scope of the appended claims.

I claim:

1. Scanning apparatus comprising concave spherically-curved reflector means having a concave spherically-curved equivalent focal surface, said surface having a radius of curvature $F$, a light-sensitive film strip mounted a distance $K$ from the center of curvature of said equivalent focal surface on the opposite side of said center from said reflector means and having a substantially straight-line portion to be scanned, and scanning means for directing light onto said spherically curved reflector means from a point in space, said spherically curved reflector means reflecting a scanning beam onto said substantially straight-line portion of said film strip, said scanning means moving said point in space along a curved path defined with respect to said center substantially by the formula $$P = F(X/X + \cos\theta),$$

where $P$ is the distance between said point in space and the center of curvature of said equivalent focal surface, $X = K/F$ and $\theta$ is the scan angle formed by said scanning beam with a line normal to said substantially straight-line portion of said film strip, said scanning beam being in focus at all points along the line scanned on said film strip.

2. Scanning apparatus according to claim 1 wherein said scanning means comprises a rotating reflecting prism.

3. Scanning apparatus according to claim 1 wherein said spherically curved reflector means comprises a Mangin mirror.

4. Scanning apparatus comprising a source of electromagnetic radiation, optical means for forming a converging beam of electromagnetic radiation from said source, scanning reflector means mounted to intercept said converging beam and reflect it to form in space a first real image of said source, concave spherically curved reflector means mounted to reflect said first real image along a scanning beam path to form a second real image, and motive means for rotating said scanning reflector means, said concave reflector means having a spherically curved equivalent focal surface and said scanning reflector means having a reflecting surface near the center of curvature of said focal surface so that, upon rotation of said scanning reflector means, said first real image traverses a limacon curve, said scanning reflector means being mounted with respect to said concave reflector means so that said limacon curve lies between said focal surface and the center of curvature of said focal surface, said second real image simultaneously traversing a substantially straight line as said first real image traverses said limacon curve and moving along said substantially straight line with a speed directly proportional to the tangent of the angle formed by said scanning beam with a line normal to said substantially straight line, further comprising a record medium having a record surface containing said substantially straight line.

5. A method of scanning comprising the steps of mounting a light-sensitive film strip so that it presents a substantially straight-line portion to be scanned, mounting spherically curved reflector means having focal length $F$ so that the center of the equivalent focal surface thereof is a perpendicular distance $K$ from said straight-line portion, moving a point source of light along a curve substantially defined by the equation $$P = F(X/X + \cos\theta),$$

where $P$ is the distance from said center of curvature to said point source of light, $X = K/F$, and $\theta$ is the angle formed by the line defined by said point source of light and said center of curvature with a line drawn perpendicularly from said center of curvature to said substantially straight-line portion.

6. A method according to claim 5 comprising the step of modulating said scanning beam so that said light-sensitive film strip makes a photographic record.

* * * * *